United States Patent
Baumgartner et al.

(10) Patent No.: US 9,599,217 B2
(45) Date of Patent: Mar. 21, 2017

(54) TRANSMISSION UNIT

(71) Applicant: Brose Fahrzeugteile GmbH & Co. KG, Wuerzburg, Wuerzburg (DE)

(72) Inventors: Joachim Baumgartner, Volkach (DE); Dominik Fueller, Wuerzburg (DE); Christoph Otto, Wiesenfeld (DE); Martin Pondelek, Wuerzburg (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 0 days.

(21) Appl. No.: 13/941,069

(22) Filed: Jul. 12, 2013

(65) Prior Publication Data

US 2014/0013882 A1  Jan. 16, 2014

(30) Foreign Application Priority Data

Jul. 12, 2012 (DE) .................. 10 2012 013 947

(51) Int. Cl.
*F16C 3/04* (2006.01)
*F16H 61/26* (2006.01)
*F16H 61/32* (2006.01)
*F16H 57/02* (2012.01)

(52) U.S. Cl.
CPC ............. *F16H 61/26* (2013.01); *F16H 57/02* (2013.01); *F16H 61/32* (2013.01); *F16H 2057/02034* (2013.01); *Y10T 74/19251* (2015.01)

(58) Field of Classification Search
CPC .......... F16H 61/26; F16H 57/02; F16H 61/32; F16H 2057/02034
USPC .............................. 74/661; 180/6, 65.6, 65.25
See application file for complete search history.

(56) References Cited

U.S. PATENT DOCUMENTS

| 3,487,246 | A | * | 12/1969 | Long | H02K 3/26 310/154.21 |
| 5,689,994 | A | * | 11/1997 | Nagai | B23Q 1/25 310/80 |
| 6,308,794 | B1 | * | 10/2001 | Oppitz | B60K 6/26 180/54.1 |
| 6,923,041 | B2 | * | 8/2005 | Harada | G01L 23/221 73/35.07 |
| 8,267,223 | B2 | * | 9/2012 | Ideshio | B60K 6/52 184/6 |
| 8,657,094 | B2 | * | 2/2014 | Kawashima | F16D 25/123 180/65.25 |

(Continued)

FOREIGN PATENT DOCUMENTS

| DE | 26 44 414 A1 | 3/1978 |
| DE | 203 04 904 U1 | 4/2004 |

(Continued)

OTHER PUBLICATIONS

DE Search report dated Jun. 18, 2013.

*Primary Examiner* — William Kelleher
*Assistant Examiner* — Zakaria Elahmadi
(74) *Attorney, Agent, or Firm* — Muncy, Geissler, Olds & Lowe, P.C.

(57) ABSTRACT

A transmission unit of a motor vehicle, with a transmission having a transmission shaft and with an electric motor that is coupled thereto in an axial direction and that has a stator and that has a rotor arranged on a motor shaft and that is bearingless on the A-side. The electric motor includes an end plate on the B-side, and the stator is located at least partly inside a housing of the transmission.

15 Claims, 2 Drawing Sheets

(56) References Cited

U.S. PATENT DOCUMENTS

| | | | | |
|---|---|---|---|---|
| 2004/0112319 A1* | 6/2004 | Hnilica | ................ | F02N 15/066 123/179.25 |
| 2004/0154846 A1* | 8/2004 | Kira | ...................... | B60K 6/405 180/65.6 |
| 2009/0000411 A1* | 1/2009 | Nakayama | .......... | F16H 63/3466 74/335 |
| 2009/0078489 A1* | 3/2009 | Feier | ................... | F16H 61/0006 180/339 |
| 2009/0251030 A1* | 10/2009 | Fujimoto | ............. | B62D 5/0406 310/68 B |
| 2011/0094806 A1* | 4/2011 | Mack | ..................... | H02K 7/003 180/65.6 |
| 2011/0318099 A1* | 12/2011 | Le Quere | ................ | F16C 1/107 403/376 |
| 2012/0031215 A1* | 2/2012 | Feier | ................... | F16H 61/0006 74/473.12 |
| 2013/0192400 A1* | 8/2013 | Dodo | ....................... | B60K 1/00 74/421 A |

FOREIGN PATENT DOCUMENTS

| | | |
|---|---|---|
| DE | 10 2009 046 192 A1 | 5/2011 |
| WO | WO 2010/108532 A2 | 9/2010 |

* cited by examiner

TRANSMISSION UNIT

This nonprovisional application claims priority under 35 U.S.C. §119(a) to German Patent Application No. DE 10 2012 013 947.0, which was filed in Germany on Jul. 12, 2012, and which is herein incorporated by reference.

BACKGROUND OF THE INVENTION

Field of the Invention

The present invention relates to a transmission unit of a motor vehicle, with a transmission and with an electric motor coupled thereto in the axial direction. The invention also concerns such an electric motor.

Description of the Background Art

In at least partly automatic transmissions of motor vehicles, the individual shift stages (gears) are set by means of a transmission actuator. For this purpose, the transmission actuator has a so-called selector finger and an electric motor, wherein the selector finger can be moved by the electric motor, and wherein the position of the selector finger determines the desired transmission ratio.

A brushless electric motor whose stator is supplied with current by an electronics unit is usually used as the electric motor. The electronics unit comprises a number of semiconductor components that are connected in a bridge circuit. The bridge circuit is customarily a three-phase bridge circuit, and the stator has three field windings that are connected to one another either in a delta or star circuit. For shielding and to avoid any damage to the field windings, the stator is located in a motor housing.

It is known from WO 2010/108532 A2, which corresponds to US 20120031215, to attach the electronics unit to the stator housing by means of screws. The electronics unit in this design is thermally insulated from the stator housing in order to avoid an exchange of heat from the stator housing to the electronics unit and a cooling element located thereon. The electronics unit is thus in uninsulated contact with the stator and the stator housing only through the screws and the elements required for driving the field windings. The stator itself is located in a recess in a transmission housing and is screwed thereto.

A drive shaft of the electric motor is designed as a worm gear shaft and projects into the interior of the transmission housing. The drive shaft in this arrangement is supported by means of two bearings designed as ball bearings, which are axially offset relative to one another. Located between the two bearings is a radial shaft seal that seals the region of the recess and the region of the interior of the transmission.

SUMMARY OF THE INVENTION

It is therefore an object of the present invention to provide a particularly suitable transmission unit and an associated electric motor, which preferably are simple to assemble and, in particular, are reduced in weight.

The transmission unit is part of a drive train of a motor vehicle, for example, but can of course also be used elsewhere in the vehicle. The transmission unit comprises a transmission with a transmission housing, within which a transmission shaft is located and rotatably supported. A number of gears sit on the transmission shaft, for example, which mesh with further components of the transmission. The transmission unit additionally has an electric motor, which includes a stator and a rotor, wherein the rotor is located on a motor shaft of the electric motor.

The electric motor is mounted on the transmission in the axial direction, wherein the stator of the electric motor is located at least partly inside the housing of the transmission. In other words, the transmission shaft runs parallel to the motor shaft. In this arrangement, no bearing is present on the side of the electric motor facing the transmission; the electric motor is thus bearingless on the A-side. For example, the motor shaft is arranged in a bearing of the electric motor that is attached to an end plate of the electric motor on the B-side. Preferably, this is the only bearing of the electric motor. Here and in the following, B-side refers to the cylindrical electric motor's base facing away from the transmission.

Because the motor shaft is supported with only one bearing, the shaft can be adjusted a relatively great distance to the position of the transmission shaft during assembly, for which reason the other components of the electric motor and transmission can be designed to be relatively clearance-free. In like manner, relatively large manufacturing tolerances can be chosen in the production of the electric motor and transmission since compensation can take place via the relatively free positioning of the motor shaft. The reduced stability and/or robustness of the electric motor caused by the absence of an A-side bearing is compensated for by the positioning of the stator inside the transmission housing, which also reduces the installation space of the transmission unit in the axial direction. Namely, if the electric motor is subjected to shock, the forces act on the comparatively stable stator and not on the connection point between the motor shaft and transmission shaft. Bending of the motor shaft is avoided as a result.

Another aspect of the absence of the A-side bearing is the reduced weight of the transmission unit, which is intensified by the preferred omission of an A-side base plate. In like manner, the internal friction of the transmission unit is reduced because of the absent bearing. In addition, due to the omitted A-side bearing, the support of the shafts of the transmission unit is not overconstrained—because of the total of, preferably, only three bearings—which is a considerable advantage.

The part of the stator located inside the transmission housing can be at least partly enclosed in a form-fitting way by a corresponding recess of the transmission housing. In other words, at least part of the stator of the electric motor is not enclosed and/or held by a housing of the electric motor, but instead is relatively unprotected. This part is arranged inside the recess in a form-fitting way. Because of this, the connection between the electric motor and the transmission is capable of supporting relatively high loads, and a heat exchange between the stator and the transmission housing is relatively unhindered. In addition, positioning of the electric motor on the transmission is facilitated, and the weight of the transmission unit is reduced because of the partial absence of a motor housing in the area.

Preferably, the recess here is stepped in design, with the size of the recess increasing as the distance from the B-side of the electric motor decreases. In this design, the stator is enclosed from the region of the step onward by a motor housing, which in turn is accommodated by the recess, in particular in a form-fitting manner. In this way, not only is a robust coupling of the electric motor to the transmission made possible, but the entry of foreign particles into the electric motor in the region of the interface between the two housings is also avoided.

In an embodiment, the two shafts, the motor shaft and the transmission shaft, are partially placed one inside the other. In other words, the axis of rotation of the transmission shaft corresponds to the axis of rotation of the motor shaft. Assembly of the transmission unit is simplified as a result of the placement of the two shafts one inside the other. For assembly, it is only necessary to place the electric motor with the motor shaft on the transmission shaft and introduce the stator into the transmission housing in the axial direction. Relatively large production tolerances, which can be compensated for by means of the positioning of the electric motor along the axial direction, can be chosen here. For power transmission from the electric motor to the transmission shaft, the two shafts have corresponding structures that engage one another. For example, the two shafts are latched into one another. In this way, no additional elements need be employed for assembly.

In an embodiment, the structures can be teeth, which are arranged along the inner or outer circumferences of the two shafts, in particular at regular intervals. For example, the transmission shaft in this design is externally toothed, thus being implemented in the manner of a gear in the subsection facing the motor, also called the transmission shaft end. The corresponding region of the motor shaft, also referred to as its shaft end, is hollow and internally toothed there, with the tooth sizes of the two shafts matching one another.

The stator region located inside the transmission housing has at its free end an insulating ring, which is made of a silicone or relatively deformable plastic, for example. Preferably, the outer diameter of the insulating ring corresponds to the outer diameter of the stator in the region of mutual contact. The insulating ring itself has the shape of a frustum of a cone and has an opening for unhindered passage of the motor shaft. A frustum of a cone here is understood to mean that the outer diameter of the insulating ring decreases as the distance from the B-side of the motor increases. When the recess in the transmission housing is present, the insulating ring preferably rests on the bottom of the recess. During assembly of the transmission unit, the stator is inserted into the recess, with the insulating ring being employed as a centering aid. In the assembled state, the insulating ring prevents the entry of foreign particles into the space occupied by the rotor of the electric motor.

The B-side end plate can have a mounting lug, hereinafter referred to as the first mounting lug, through which a screw or rivet is inserted. With the aid of this fastening component, the electric motor is attached to the transmission, and slipping of the electric motor in the axial direction is avoided. Preferably, the end plate rests at least partially on the transmission housing in this design. By means of fastening of this nature, the transmission unit is relatively insensitive to shock since shear forces that occur are compensated for, firstly through a relatively large lever arm implemented by means of the screw or rivet, and secondly through an arrangement of the stator inside the transmission housing. Furthermore, no additional retaining elements, such as angle elements, which increase both the weight and the cost of the transmission unit, are required on the electric motor or on the transmission.

In useful fashion, an electronic drive unit of the electric motor is fastened to the B-side end plate. To this end, the B-side end plate includes a mounting lug, hereinafter referred to as the second mounting lug, through which a screw or rivet is inserted. Because of the positioning of the electronic drive unit on the side of the electric motor opposite the transmission, the electronic drive unit is relatively unimpaired by heating of the transmission or vibration of the transmission. Moreover, separate cooling of the electronic drive unit is facilitated. When both the first and second mounting lugs are present, assembly of the transmission unit is advantageously facilitated, especially since work only has to be performed at one place, namely at the B-side end plate, specifically the installation of the fasteners.

The electric motor can be a brushless electric motor that is supplied with current by means of a bridge circuit, in particular a three-phase bridge circuit. The bearing preferably is designed as a ball bearing and is integrated into the B-side end plate. The electric motor and the bridge circuit integrated into the electronic drive unit are components of a transmission actuator, by means of which a transmission is actuated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
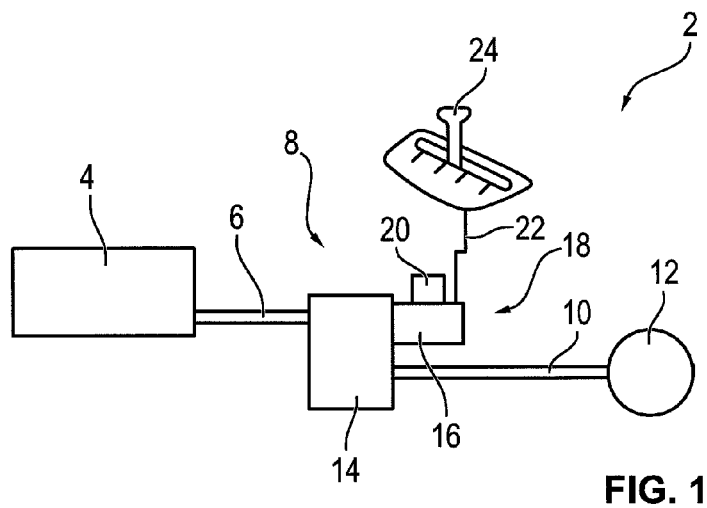
FIG. 1 is a drive train of a motor vehicle in a simplified schematic view.

In FIG. 1 a simplified schematic view of a drive train 2 of a motor vehicle is shown. An internal combustion engine 4 stands in operative connection with drive wheels 12 through a first shaft 6, a transmission unit 8, a second shaft 10, and a differential that is not shown. In this arrangement, the rotational motion of the first shaft 6, which is driven directly by the internal combustion engine 4, is converted into a rotational motion of the drive wheels 12, with both the direction of rotation and the rotational speeds of the two being different. Because of the differential, the rotational motion of the drive wheels 12 takes place essentially at a right angle to the rotational motion of the second shaft 10.

By means of a transmission 14 of the transmission unit 8, a torque provided by the internal combustion engine 4 is transmitted variably to the drive wheels 12. For this purpose, the transmission 14 has a clutch that is operated by means of a transmission actuator 18 that includes an electric motor 16. The transmission actuator 18 additionally has an electronic drive unit 20 that controls the electric motor 16. The electronic drive unit 20 is adjusted by a gearshift lever 24 via a data line 22. The data line 22 is a CAN bus, and a driver can, using the gearshift lever 24, select whether and how many of the drive wheels 12 are supplied with the torque provided by the internal combustion engine 4.

Figure 2:
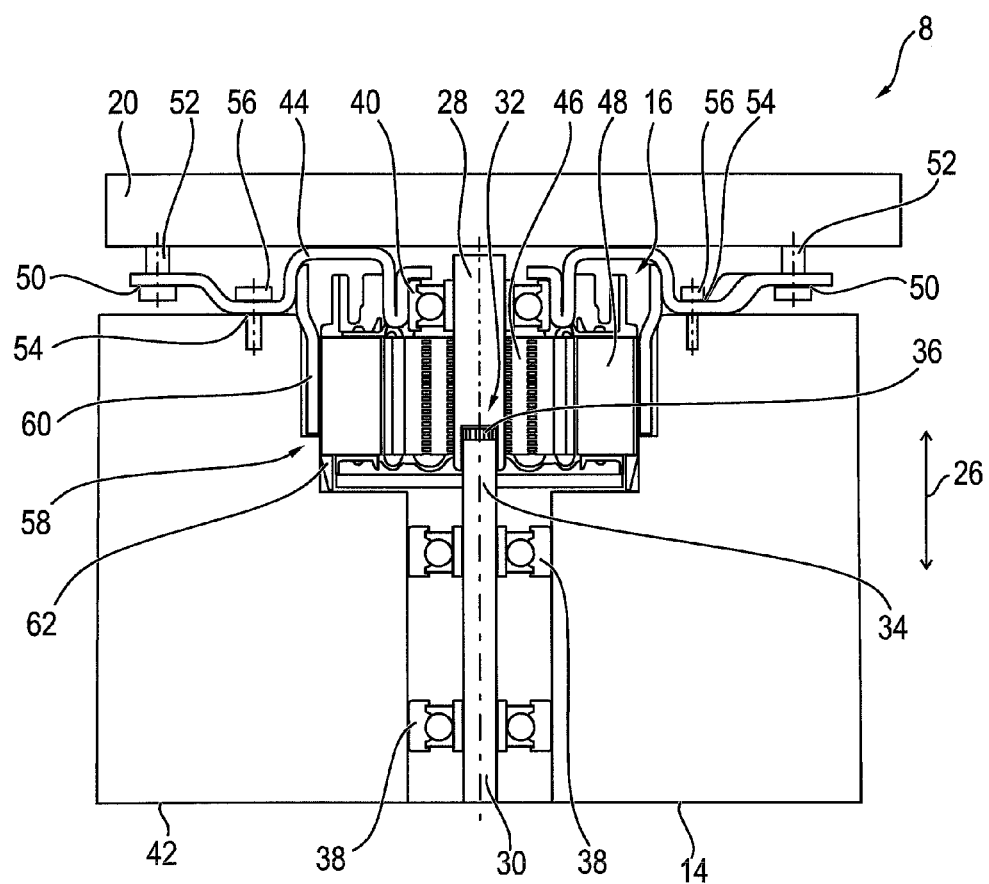
FIG. 2 is a cross-sectional representation along an axial direction of a transmission unit.

FIG. 2 shows the transmission unit 8 in a cross-sectional representation along an axial direction 26, wherein the axial direction 26 corresponds to the longitudinal direction of a cylindrical motor shaft 28 of the electric motor 16 and to the longitudinal direction of a cylindrical drive shaft 30 of the transmission 14. In other words, the motor shaft 28 is parallel to the transmission shaft 30 and to the axial direction 26. The two shafts 28, 30 are aligned such that the axis of rotation of the motor shaft 28 coincides with the axis of rotation of the transmission shaft 30.

The two shafts 28, 30 are coupled to one another, wherein the shaft end 32 of the motor shaft 28 that faces the transmission shaft 30 is made hollow and accommodates within itself the shaft end 34 of the transmission shaft 30 that faces the motor shaft 28. In other words, the two shafts 28, 30 are placed one inside the other. In order to effectively transfer a rotary motion of the motor shaft 28 into a rotary motion of the transmission shaft 30, the transmission shaft end 34 is designed to be externally toothed. In other words, the transmission shaft end 34 has on its circumference a number of uniformly spaced teeth 36 that mesh with corresponding teeth 36 formed on the cavity-like recess of the motor shaft end 32 on the motor shaft 28.

The assembly formed from the motor shaft 28 and the transmission shaft 30 is rotatably mounted by means of two transmission bearings 38 and one motor bearing 40. The two transmission bearings 38 are arranged within a transmission housing 42 of the transmission 14, in which transmission elements that are not shown in detail here, for example gears, are also accommodated. The transmission housing 42 itself is made of metal.

The motor bearing 40 is press-fitted into a B-side end plate 44 of the electric motor 16 made of sheet metal. The B-side end plate 44 in this design is located on the side of the electric motor 16 opposite the transmission 14. Consequently, a rotor 46 located on the motor shaft 28 and a stator 48 standing in operative connection therewith are located between the motor bearing 40 and the transmission bearings 38. The electric motor 16 is thus of bearingless design on the A-side, with an A-side end plate also being absent. The stator 48 is supplied with current by means of the electronic drive unit 20, which rests on the end plate 44 and is fastened there. For this purpose, the end plate 44 has a number of second mounting lugs 50 through which screws 52 are inserted and are screwed into corresponding receptacles in the electronic drive unit 20. The electronic drive unit 20 in this design includes a number of semiconductor elements that are connected to form a bridge circuit.

The end plate 44 also has a number of first mounting lugs 54, through which a corresponding number of screws 56 are inserted, wherein the screws 56 are screwed into the transmission housing 42. In this arrangement, the end plate 44 rests on the transmission housing 42 in order to avoid tilting of the electric motor 16 relative to the transmission 14, and consequent bending of the shaft assembly 28, 30 due to an increased lever arm. For the purpose of stabilization, the electric motor 16 is located partially within the transmission housing 42, shortening the installation space of the transmission unit 8 in the axial direction 26. To this end, the stator 48 is partially inserted in a stepped recess 58 of the transmission housing 42. In the region of its reduced diameter, the recess 58 contacts the stator 48 in a form-fitting manner. In the region of increased diameter, which is to say behind the step, a hollow, cylindrical motor housing 60 is located between the stator 48 and the transmission housing 42. The motor housing 60 made from sheet metal encloses the stator 48 in a form-fitting manner in the associated area, and is attached to the B-side end plate 44. The recess 58 of the transmission housing 42, in turn, encloses the motor housing 60 in a form-fitting manner.

Figure 3:
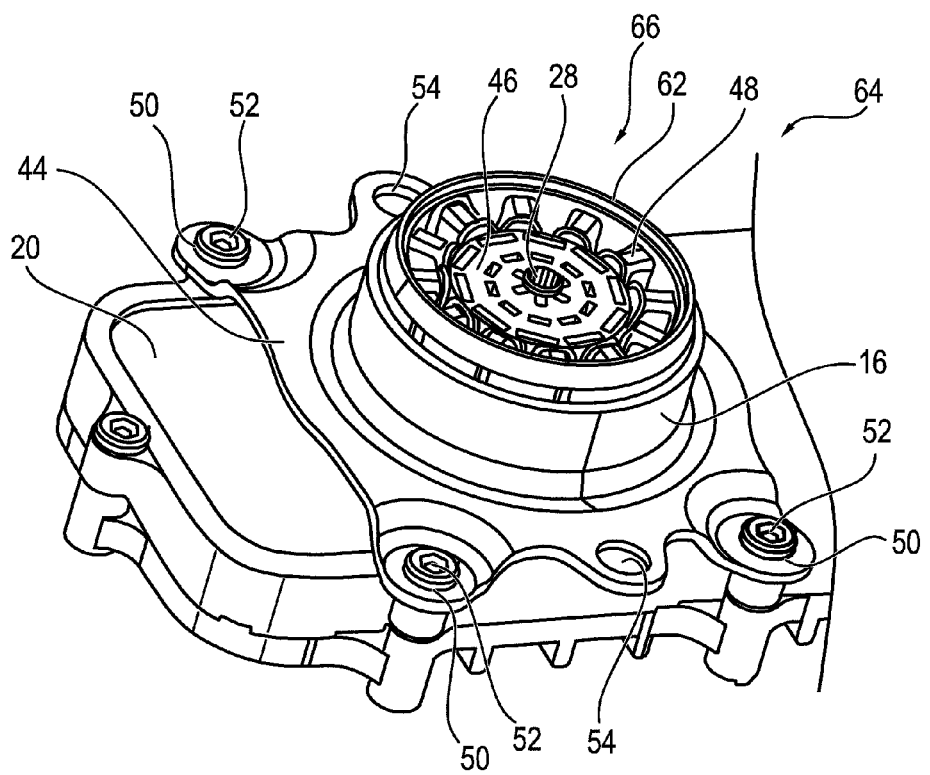
FIG. 3 is a perspective view of an electric motor of the transmission unit.

An insulating ring 62 made of a rubber is located on the stator 48 on the side facing the transmission 14, as is also shown in FIG. 3. This figure shows the electric motor 16 with installed electronic drive unit 20, but without the transmission 14, which are components of an actuator 64 of the motor vehicle. The insulating ring 62 has the shape of a frustum of a cone, wherein the outer diameter of the insulating ring 62 decreases with increasing distance from the end plate 44. The axis of the frustoconical insulating ring 62 coincides with the axis of rotation of the motor shaft 28. A central opening 66 through which the rotor 46, which has a number of permanent magnets, can be introduced into the electric motor 16 is provided in the insulating ring 62. By means of the insulating ring 62, the entry of foreign particles through the recess 58 into the region of the rotor 46 is prevented in the assembled state. In addition, the insulating ring 62 serves as a positioning aid during assembly of the transmission unit 8, since tilting of the stator 48 on the step of the recess 58 can be avoided therewith.

The invention is not limited to the exemplary embodiment described above. Rather, other variants of the invention can also be derived herefrom by a person skilled in the art without departing from the subject matter of the invention. In particular, moreover, all individual features described in connection with the exemplary embodiment can also be combined with one another in other ways without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A transmission unit of a motor vehicle, the transmission unit comprising:
   a transmission having a transmission shaft;
   an electric motor that is coupled to the transmission in an axial direction, the electric motor having a stator and a rotor arranged on a motor shaft;
   a motor bearing supporting the motor shaft; and
   an electronic drive unit facing an end surface of a transmission housing,
   wherein the electric motor is bearingless on an a first side,
   wherein the electric motor has an end plate on a second side,
   wherein the motor bearing is attached to the end plate, and
   wherein the stator is arranged at least partly inside the transmission housing,
   wherein an opening is disposed between the electronic drive unit and the end surface,
   wherein the end plate is mounted on the end surface in the opening between the end surface and the electronic drive unit, and
   wherein at least a portion of the stator is not enclosed.

2. The transmission unit according to claim 1, wherein a portion of the stator that is located inside the transmission housing is at least partly enclosed in a form-fitting manner by a corresponding recess of the transmission housing.

3. The transmission unit according to claim 2, wherein the recess is stepped and rests against a housing of the motor on a circumference thereof.

4. The transmission unit according to claim 1, wherein the transmission shaft and the motor shaft are placed one inside the other, and wherein corresponding structures of the motor and transmission shafts engage one another.

5. The transmission unit according to claim 4, wherein the motor shaft accommodates a facing shaft end of the transmission shaft, and wherein, in this region, the motor shaft is internally toothed and the transmission shaft is externally toothed.

6. The transmission unit according to claim 1, wherein the stator has a frustoconical insulating ring with a central opening on a free end at the transmission side.

7. The transmission unit according to claim 1, wherein the electric motor is fastened to the transmission housing via a screw or rivet extending through a mounting lug of the end plate, and wherein the end plate rests at least partially on the transmission housing.

8. The transmission unit according to claim 1, wherein the electronic drive unit is fastened to the electric motor via a screw or rivet extending through a mounting lug of the end plate.

9. An electric motor of a motor vehicle actuator, in particular of a transmission unit according to claim 1.

10. The transmission unit according to claim 1, wherein the motor bearing is a single bearing supporting the motor shaft.

11. The transmission unit according to claim 1, wherein the motor shaft is supported by only a single bearing, the single bearing comprising the motor bearing.

12. The transmission unit according to claim 1, wherein the motor shaft is parallel to the transmission shaft.

13. The transmission unit according to claim 1, wherein the motor shaft is coupled to the transmission shaft.

14. The transmission unit according to claim 1, wherein the transmission shaft has a plurality of uniformly spaced external teeth that mesh with corresponding teeth disposed on a recess of the motor shaft.

15. The transmission unit according to claim 1, wherein the end plate comprises:
a curved body;
a hole through which the motor shaft extends;
a plurality of first mounting portions for mounting the end plate to the transmission housing; and
a plurality of second mounting portion for mounting the electronic drive unit to the end plate.

\* \* \* \* \*